Figure 1A:
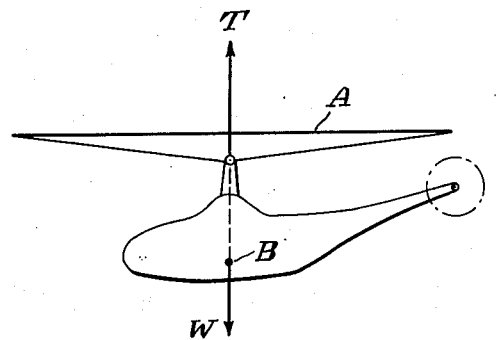

June 16, 1953 — R. H. MILLER — 2,642,143
HELICOPTER ROTOR
Filed May 20, 1948 — 5 Sheets-Sheet 1

HOVERING

PLAN VIEW

TIP PATH PLANE TILTED FORWARD

HELICOPTER PITCHES FORWARD

INVENTOR.
René H. Miller

June 16, 1953     R. H. MILLER     2,642,143
HELICOPTER ROTOR
Filed May 20, 1948     5 Sheets-Sheet 2
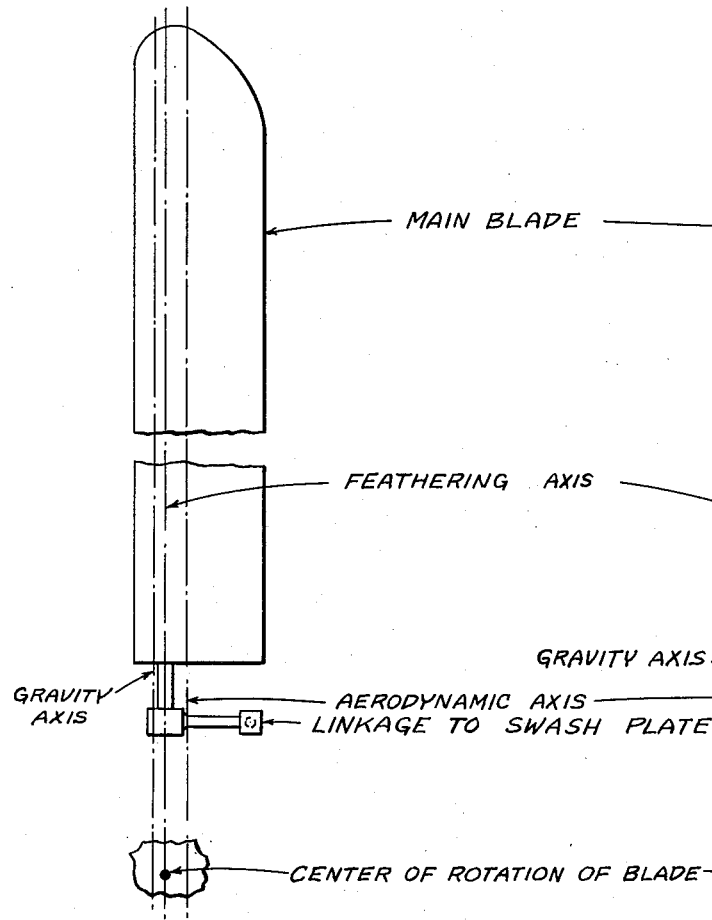
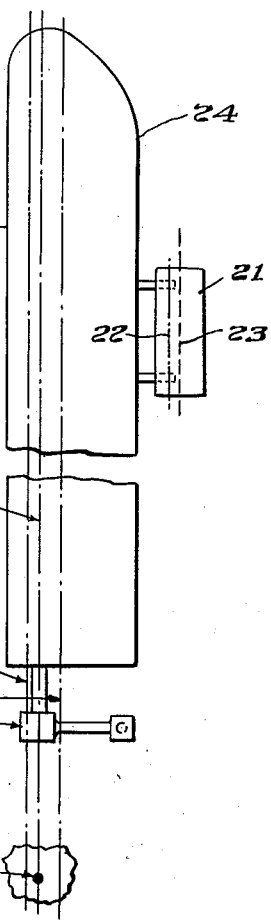
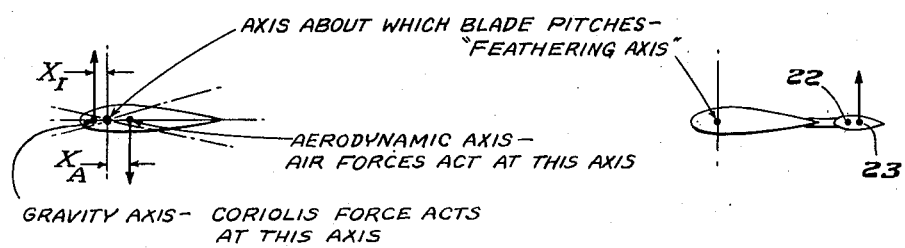
INVENTOR.
René H. Miller

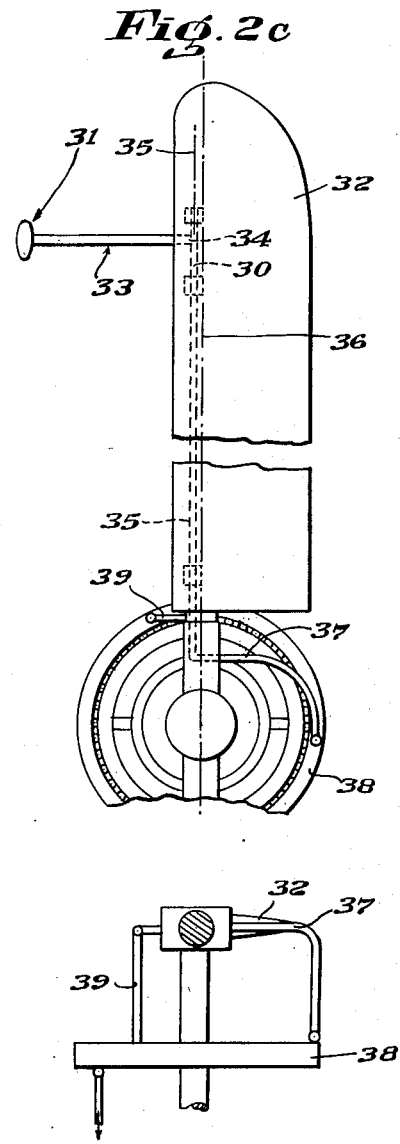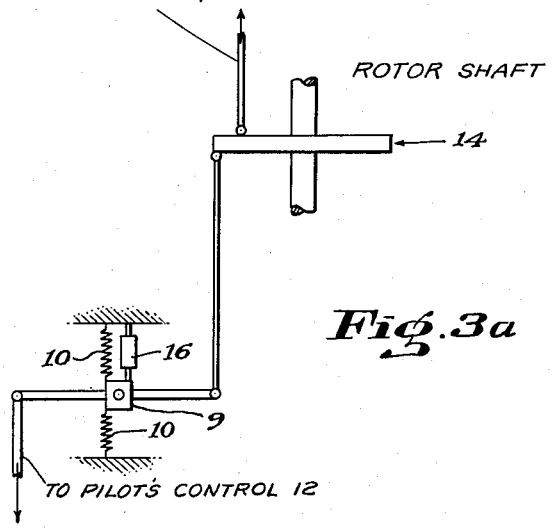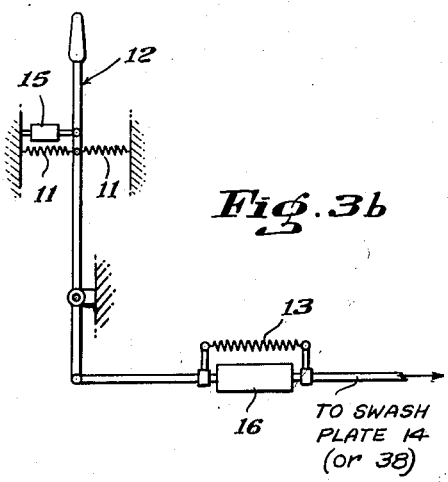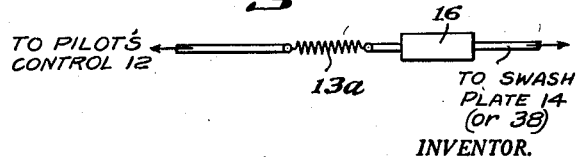

June 16, 1953 R. H. MILLER 2,642,143
HELICOPTER ROTOR
Filed May 20, 1948 5 Sheets-Sheet 4

TO PILOTS CONTROL AND/OR RESTRAINING MEANS

INVENTOR.
René H. Miller

June 16, 1953  R. H. MILLER  2,642,143
HELICOPTER ROTOR
Filed May 20, 1948  5 Sheets-Sheet 5
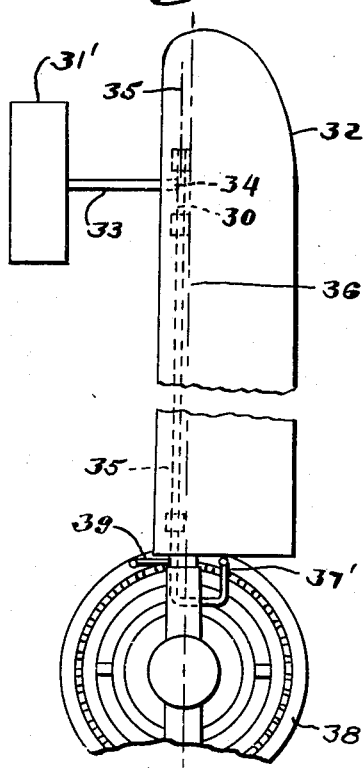
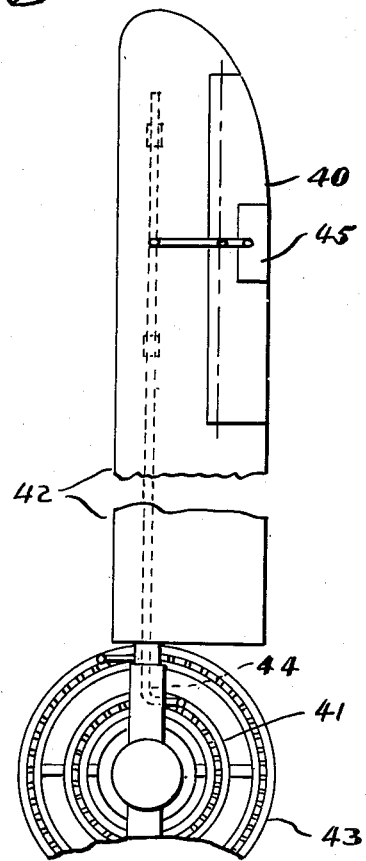
René H. Miller
*INVENTOR.*

Patented June 16, 1953

2,642,143

UNITED STATES PATENT OFFICE 2,642,143

HELICOPTER ROTOR

René H. Miller, Boston, Mass.

Application May 20, 1948, Serial No. 28,071

16 Claims. (Cl. 170—160.25)

This invention relates to novel helicopters and other rotary wing aircraft having greatly improved stability and control characteristics attained by the provision of adequate damping in pitch and roll.

A conventional helicopter is inherently unstable in pitch and roll, and will not stay in any attitude into which a pilot has put it unless it is kept there (approximately) by constant slight manipulation of the controls. Thus no one control position or pressure will answer, except momentarily; nor can a pilot "trim" such a helicopter so that it will fly at any particular attitude or speed. The pilot's situation, then, may be likened to that of a man standing and walking on stilts, or, indeed, hopping on a single stilt.

A flying machine should, in order to have satisfactory handling characteristics, resist any angular displacements in pitch and roll, occurring as a result of control manipulations, gusts, or from any other disturbance, with a restoring moment proportional to the rate at which said angular displacements occur. Such moments act to damp the motion of the helicopter and hence are referred to as the "damping" of the helicopter. Restoring moments proportional to the amount of the displacement are also desirable but their provision is not the prime purpose of this invention, although normally they also are obtained as a by-product.

Figure 4:
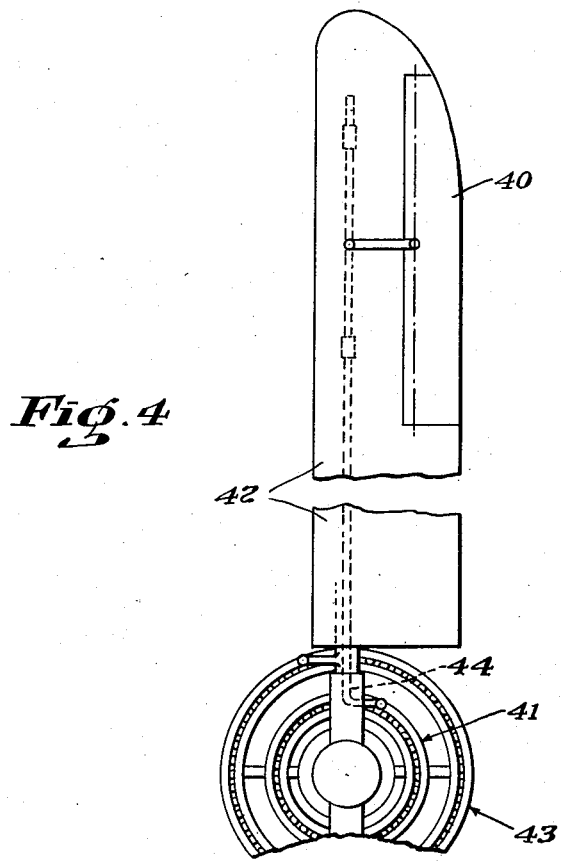
Figure 4A:
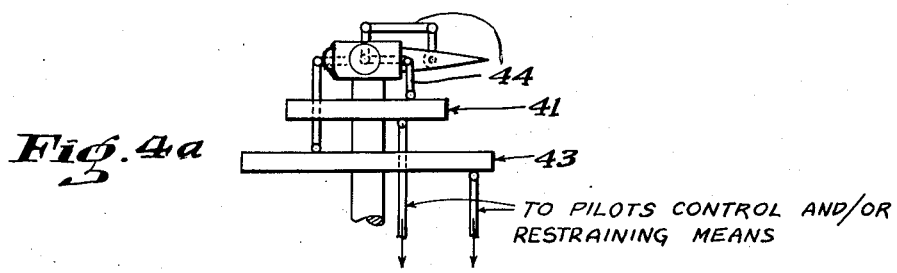

In the drawings:

Figs. 1a–1d inclusive are diagrams of a typical helicopter (with body, and power-driven sustaining and tail rotors) in which the invention may be employed;

Figs. 2a–2d inclusive are diagrammatic plan views (with respective elevations therebelow) illustrating various types of rotor blades of the helicopter of this invention;

Figs. 3a–3c inclusive are diagrammatic elevations illustrating various types of restricted control devices that may be employed in helicopters of this invention; and Figs. 4–4b illustrate further modifications of the invention.

Considering first the case of a helicopter with an articulated rotor (blades free to flap or rock perpendicular to the plane of rotation). With such a helicopter, control is usually achieved by a cyclical change in pitch of the blades by a conventional swash plate or equivalent device as currently employed in the art. This cyclical pitch change may be used to tilt the plane of rotation of the blades in any desired direction relative to the body of the helicopter, and since the thrust is perpendicular to the plane of rotation, the line of action of the thrust may thereby be inclined with reference to the body of the helicopter, giving rise to forces and moments tending to displace the helicopter in space.

Figure 1B:
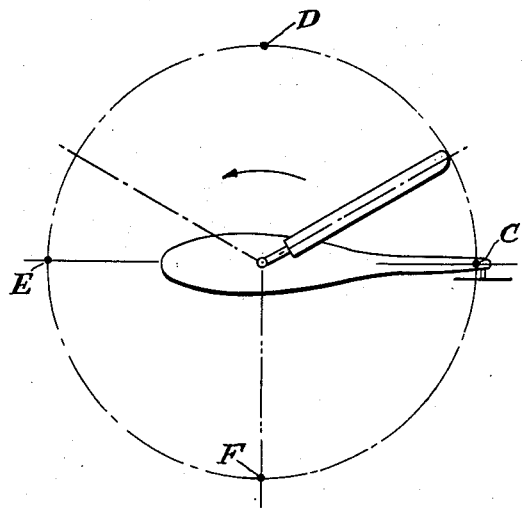
Figure 1C:
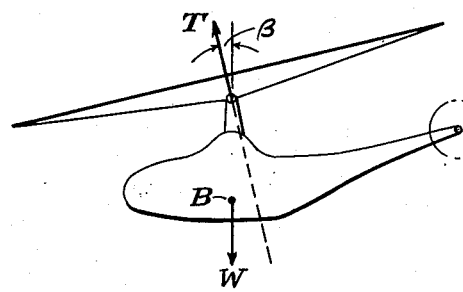
Figure 1D:
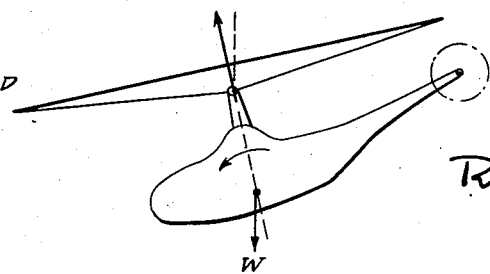

Referring to Fig. 1a—it shows a helicopter hovering normally in still air. The line of action of the thrust, T, produced by the sustaining rotor blades rotating in plane A, acts perpendicular to plane A and passes through the center of gravity, B, of the helicopter. T is equal to the weight W of the helicopter, acting at B. Referring now to Fig. 1b—there is assumed a manually controlled cyclical pitch variation applied as by a swash plate to the blades (say three) so that the pitch of each blade is decreased sinusoidally from a neutral position at C to a minimum at D and back to the neutral position at E, then increased to a maximum at F, the pitch returning once more to the neutral position at C. In accordance with standard flapping and teetering blade helicopter theory and practice, such a cyclical pitch change causes the plane of rotation of the blades, A, to tilt forwardly through an angle $\beta$, Fig. 1c, where $\beta$ is exactly equal to the maximum change in pitch of the blade, which occurs at D and F. Because the thrust is always substantially perpendicular to the plane of rotation A of the blades, it follows that, by thus tilting plane A through an angle $\beta$, T is also tilted through an angle $\beta$, and a force propelling the helicopter forward will be produced. Also, since the line of action of the thrust no longer acts through the center of gravity, B, of the helicopter, a pitching moment tending to pitch the helicopter nose down as shown in Fig. 1d, is also produced. The helicopter is thus displaced from its position of equilibrium but there are no appreciable forces, either proportional to rate or displacement, tending to resist this motion with the result that the helicopter will tend to increase such forward pitching to an unwanted or dangerous extent, even upon neutralization of the controls.

Thus, a conventional helicopter has an oversensitive response to control manipulation with attendant large overshoots and difficulty for the pilot in stabilizing of any desired position. Various devices have been suggested and to some extent used in attempts to overcome these objections just referred to, but none of such devices has the advantages nor the simplicity of helicopters of the present invention.

The herein described invention overcomes said objections and provides important advantages by applying directly to the blade itself cycle pitch variations (restrained to a certain degree as hereinafter described) which produce restoring moments proportional to the rate of helicopter pitching and rolling. The invention contemplates automatically imposing a corrective cyclical pitch change to the blades such that the individual blade pitch will tend to increase from C to E and decrease from E to C an amount proportional to the rate at which the helicopter is pitching and/or rolling. The tip path plane will start inclining backwards and a damping moment tending to resist excessive nose down pitching of the helicopter will be produced proportional to the rate of helicopter pitching—in other words, a highly beneficial damping moment, and to any desired extent. Such a corrective stabilizing cyclical pitch change is accomplished in the following manner:

When the helicopter tip-path plane pitches, the rotor blades, by virtue of their rotation, experience a force directly proportional to the rate of such pitching. This force acts perpendicular to the plane of rotation, A, and reaches a maximum value upward at point D, a maximum value downward at point F (for nose down pitching), and is zero at points E and C. It is known as the Coriolis force and is the force which would give rise to a gyroscopic moment if the blades were rigidly attached to the helicopter drive shaft. Such a Coriolis force is due to the Coriolis acceleration which always exists when an angular velocity of a body about a point is combined with a linear velocity towards or away from that point. In the case of theh pitching rotor, of Fig. 1c, the pitching velocity $$\frac{d\beta}{dt}$$

about the hub provides the angular velocity. That a linear velocity in Fig. 1c to and from the hub exists will become evident when Figs. 1b and 1c are viewed together. In Fig. 1b the blade is shown rotating about the hub at constant speed. If an element of the blade is projected down to Fig. 1c (or up to Fig. 1a) and the blade is then rotated at constant speed in the plane of Fig. 1b it will be seen that the element, viewed in the plane of Fig. 1c will move towards the hub as the blade passes from point C in Fig. 1b to point D, away from the hub as the blade passes from point D to point E, towards the hub from E to F and again away from the hub as the blade rotates from point E to F. Rotation of a blade element in the plane of Fig. 1b thus appears, when projected onto the plane of Fig. 1c, as a linear motion to and from the hub. Thus a rotating rotor blade, which has an angular velocity in pitch in a plane perpendicular to the plane of rotation, will be subject to Coriolis accelerations and hence forces perpendicular to its plane of rotation. In passing, it is noted that since the blades are not rigidly attached to the hub on the helicopter drive shaft but are free to flap, these Coriolis forces will of themselves cause a slight rearward tilt of the plane A on any helicopter, thereby giving rise to a small damping moment, but wholly insufficient to prevent the undesirable control response of conventional helicopters.

Now, in accordance with the application of the present invention to flapping or rocking blade helicopters, if the center of gravity of each blade is offset forwardly a distance $X_I$ (Fig. 2a) from the axis about which the blade pitch changes occur, hereafter referred to as the feathering axis, then, because the Coriolis force acts at the center of gravity of the blade, a moment is produced about the feathering axis. This moment tends to change the angle of pitch of the blade about the feathering axis an amount, and in a manner, limited by the nature and degree of the necessary restraint hereinafter described. This moment will be a maximum positive at D, a maximum negative at F, zero at E and C, and will be proportional to rate of pitch and, in accordance with the present invention, is used to achieve the desired degree of restoring cyclical pitch change proportional to rate of pitch. The amount of pitch change will be proportional to the amount of offset $X_I$ of the center of gravity from the feathering axis and to the degree of restraint provided about the feathering axis. A similar effect may be achieved by locating the aerodynamic axis of each blade aft of the feathering axis a distance $X_A$, or displacing the aerodynamic axis from the gravity axis (as shown in Figs. 2a and 2b), since, when the blade is free to flap, there will always be an opposite lift force on the blade corresponding to any externally applied force, in this case the Coriolis force (such an aerodynamic lift force is necessary if the blade is to remain in equilibrium about the flapping hinge at all times, and is produced by the flapping motion of the blade). This invention therefore contemplates achieving satisfactory damping in pitch of the helicopter by (a) moving the gravity center of the blade ahead of the feathering axis, and providing a restraint about the feathering axis, and/or (b) moving the aerodynamic center of the blade aft of the feathering axis and providing a restraint about the feathering axis, with or without the addition of camber in the blade section as hereinafter described. Note: The device of Fig. 2a and the specific description thereof have no direct application to corrective damping in helicopters with stiff blades rigidly attached to the hub or vertical drive shaft.

It may be noted that method (b) is particularly adapted, and in fact necessary, in the case of blades flexible in bending. In such cases there is no well defined feathering axis, and the gravity axis tends to define the feathering axis, at least for the outer portions of the blade. It is then only necessary to locate the aerodynamic axis aft of the feathering axis to achieve the desired effects.

The degree of stabilization and hence the improvement in helicopter control characteristic due to such damping provided in this manner may be indicated by means of the non-dimensional parameter G where $$G = \frac{I_R w^2}{K_f}$$

in the case of (a), $$G = \frac{I w^2}{K_f} \frac{X_A}{R}$$

in the case of (b), (or, combining the two, $$\frac{I_R w^2}{K_f} + \frac{I w^2}{K_f} \times \frac{X_A}{R})$$

wherein $I_R$ = Effective product of inertia of the blade about the feathering axis and flapping hinge; lbs. ft./sec.²
$I$=Moment of inertia of the blade about the flapping hinge; lbs. ft./sec.²
$w$=Rotational speed of rotor, radians/sec.
$K_f$=Restraint about the flapping hinges, ft. lbs.
$R$=Rotor radius, ft.
$X_A$=Average effective weighted distance from aerodynamic center of blade to feathering axis, ft.

The effective value of G is preferably of the order of 4 to 12.5, though it may be as low as 0.5 or as high as 20., or even somewhat more, and applied to flapping or teetering blade rotors.

The significance of the parameter G may be more readily apparent to those versed in the art of servo mechanisms by pointing out that it defines the "gear ratio" between the corrective cyclic pitch control applied to the blades, $θ_c$, and the non-dimensional rate of the disturbance, $p$, such as $θ_c = kp$, where $k$ for the above case is $2G$, and the rate of disturbance has been non-dimensionalized by dividing the rotor speed $w$ thus $$G = \frac{\text{corrective cyclical pitch control}}{2 \times \text{rate of disturbance}} = \frac{θ_c}{2p}$$

and, with the limits set forth above $$0.5 < \frac{\text{corrective cyclical pitch control}}{2 \times \text{rate of disturbance}} < 20.0$$

This statement and formula thus generalize the parameter G so that it applies to all embodiments of this invention, including rotors with rigid blades as hereinafter discussed.

In this disclosure, the disturbance used for illustration has been that of the pitching velocity of the helicopter $p$, although it is equally applicable to rolling, or a combination of pitching and rolling.

Figs. 3a–3c illustrate three types of restraining means which may be employed in applying this invention to a typical flapping rotor. In Fig. 3a, on each side of the free pivot 9, springs 10 with damper 16 are provided in the linkage to the control stick 12 in order to provide blade restraint about the feathering hinge, through the conventional swash plate 14, in the stick fixed conditions.

As shown in Fig. 3b, blade restraint may be provided about the feathering axis by means of springs 11 and a suitable damper 15, e. g. hydraulic or equivalent, attached to the control stick 12 with or without an additional spring 13 and damper 16, or, as in Fig. 3c, by means of a spring 13a and damper 16 located in the linkage system, respectively, in parallel, or in series, with the main control system. In addition to improving the stability characteristics, dampers 15 serve the additional function of damping out undesirable stick vibrations. The particular means of providing the restraint is relatively unimportant except that for the purpose of this invention a viscous restraint should not be applied in any part of the control system which rotates with the blades, and, with this exception, the invention contemplates the combination of a blade effective center of gravity offset and/or effective aerodynamic center offset, with adequate yieldable restraining means of any suitable type (whether by elastic means such as springs, viscous means such as hydraulic dampers or any other equivalent devices, or by structural elasticity of the main blade or its mounting) about the feathering axis. The restraining means may be located either at the individual blade-feathering hinge itself, as by a local spring (not shown) between the hinge and the rotatable blade-feathering shaft to which the blade is affixed (as in Figs. 2a or 2b), and/or in series at any point in the main control system leading to said shaft, as well as separate from, or parallel to said main control system.

The effective center of gravity offset may be obtained by means of weights located ahead of the blade feathering axis and either distributed along the length of the blade, or concentrated at one point or zone in said length. The effective aerodynamic center or axis offset may be obtained by moving the feathering axis relative to the blade quarter-chord point (aerodynamic center or axis), or by means of auxiliary aerodynamic surfaces located ahead of or behind the feathering axis, or by combinations of these. Normally, it is preferred to treat all blades alike as to displacement of the effective center of gravity ($X_I$) and/or center of lift or aerodynamic axis ($X_A$), though the advantages of the invention may be obtained by having less than the total number of blades so modified inasmuch as said lesser number can be made, through mechanical linkage, to exert the required effect on the remaining unmodified blade or blades, for example, through the medium of the swash plate or other cyclic pitch control means.

Since, in the practice of the invention, the effective aerodynamic center or axis or effective center of gravity is displaced from the feathering axis of the blade, then, in the steady hovering condition, there will exist large steady forces tending to twist the blades collectively (all simultaneously, as opposed to cyclically) about the feathering axis. Any undesirable effect of this twisting force may be avoided by making the collective pitch control irreversible or restrained and/or by adjusting the blade camber and using forward $X_A$ in conjunction with forward $X_I$ so as to balance out collective moments without eliminating the desired restrained cyclic moments on which the invention depends.

As mentioned earlier, this invention also provides means of increasing the restoring moment proportional to the amount of displacement, as well as proportional to rate, by virtue of the well known integrating characteristics of viscous dampers. Thus, the dampers 15 and 16 of Figs. 3a–3c may be used to convert the rate response provided by $X_I$ and $X_A$ into a displacement response. Also, it is possible advantageously to increase the stability with forward speed of the rotor by means of $X_A$, a desirable improvement as will be recognized by those versed in the art.

As a modification of this invention, instead of offsetting the center of gravity and/or the aerodynamic center of the main blade, there may be provided an auxiliary airfoil or aileron hingedly attached to the main blade to provide an effective center of gravity or aerodynamic center offset of the main blade, said airfoil or aileron having offset from its axis of movement its center of gravity and/or its areodynamic center, and whose movement about its axis (substantially or in general parallel to the feathering axis of the main blade) will then create the desired moments about the feathering axis of the main blade to feather the main blade. The auxiliary aileron or airfoil may be used in either of two ways, i. e.; it may be used to feather the blade as just described, or, the main blade may be either fixed or relatively non-feathering under the action of the auxiliary airfoil which airfoil, however, by its changed position, secures the same end result by effectively changing the shape (camber) and lift of the main blade. In the latter case, yieldable restraining means for the main blade is not essential and may be omitted. The main blade is controlled by the usual swash plate or equivalent arrangement. Thus, this auxiliary airfoil or aileron may be used as a means to provide the effective value of $X_A$ and $X_I$. It may be restrained either locally and directly about its own axis of movement or by linkages leading to any suitable restraining means as shown or described in connection with the Fig. 3 series. The effective value of the non-dimensional parameter G for this modification should fall within the limits specified above.

By suitable restraint of the blade and/or auxiliary airfoil, for example, as shown in any one of the Fig. 3 series, such effective value is readily obtained.

In Fig. 2b, the auxiliary airfoil 21 is free to move about its axis of movement 22 and has its center of gravity 23 displaced behind the axis of movement 22. Under the action of the Coriolis force the angle of attack of the auxiliary airfoil 21 will change relative to the main blades 24 and, because of the resultant descrease in lift on 21, will cause a moment about the feathering axis of 24 causing the blade to increase its pitch in the desired manner. The auxiliary airfoil 21 may alternatively be placed ahead of the leading edge of the main blade, in which case the relative positions of the center of gravity or axis of movement of the auxiliary airfoil will be reversed.

In order to compensate the steady state moments acting on the auxiliary airfoil, its axis may be slightly inclined relative to the main axis of the airfoil such that in flight, when the blades are coned, the axis of the auxiliary airfoil will be substantially perpendicular to the shaft (hub) axis of the helicopter. Alternatively, the auxiliary airfoils may be interconnected on all blades through an irreverseible collective pitch control or by adjustment of its camber and aerodynamic center relative to its axis of rotation so as to cancel out steady state moments as in the case of an offset of the main blade center of gravity.

The auxiliary airfoil may also be directly operated by the pilot as a servo which in turn controls the main blade in lieu of direct control by the pilot of the main blade as in Fig. 2a. Alternatively, the pilot may control a servo tab on the auxiliary airfoil. In such cases there would also be provided restraining means in the control system as in any one of the Fig. 3 series. The main blade itself may be free or restrained about the feathering axis as by a separate restraining system of any of the types shown in the Fig. 3 series.

A further means of achieving the purposes of this invention as applied to the flapping rotor type above described (or teetering type) but which is also and particularly applicable to the case where the blades are not free either to flap or teeter, but, instead, are restrained at the root and rigidly attached to the helicopter drive shaft, will now be described.

Referring to Fig. 2c—a mass weight 31 is shown located ahead of the main blade 32 and is supported on the end of a rod or truss 33 whose other end 34 is rotatable about an axis 35 substantially parallel to the feathering axis 36 of the main balde. Alternatively, the weight 31 may be behind the blade 32 with the linkage system reversed so as to give the same effect as in Fig. 2c. The axis 35 may be located on the feathering axis 36 of the main blade or displaced from it fore and aft. Movement of the rod 33 about its axis of rotation 35, rotates a torque tube 30 mounted for rotation in the blade 32. This tube operates linkages 37 near the root of the blade 32 in such a manner as to change the inclination of the swash plate 38 which may be restrained in any suitable way, for example as indicated in Figs. 3a–3c. This swash plate 38 may be used to apply the corrective cyclical pitch control through the links 39 to some or all the blades such that this cyclical pitch control reaches a maximum at D of Fig. 1b, or at any other azimuth position, such as C, for the following reasons. The displacement of the mass weight 31, under the action of the Coriolis forces functions as a displacement of the effective center of gravity of the main blade as discussed before, and will be proportional to rate of pitch of the helicopter and will be a maximum at D and F (Fig. 1b). Thus the cyclical pitch control applied to the blades through the swash plate 38 actuated by linkages 37 and the displacement of the mass weight 31 will also be proportional to rate of pitch. However, by suitably orienting the linkages 39 between the swash plate 38 and the main blades 32 it is possible to cause the maximum cyclical pitch control to occur not at D or F where the displacement of 31 is a maximum but at some other point such as C (Fig. 1b).

Now, in the case of a rigid rotor whose blades are cantilevered into the main rotor drive shaft of the type of Fig. 2c, control about, for instance, the axis of pitch of the helicopter would be achieved by a cyclical pitch variation which reaches a maximum not at D but at C (Fig. 1b). This is because blade lift forces and moments are transferred directly to the rotor shaft and hence there is no phase displacement between the point of maximum cyclical control and the point of maximum resultant moment applied to the body of the helicopter, as in the case of the flapping rotors discussed above. Thus this modification of the invention is particularly adapted to a rigid rotor, or one which is only partially rigid due to the structural flexibility of the blades, or one which is free to flap but about a flapping hinge located well outboard from the center of rotation of the blades. In the latter two cases, maximum cyclical feathering of the blade would occur at some point between C and D, depending on the degree of flexibility of the blade or the amount of offset of the flapping hinge from the center of rotation.

In lieu of the mass weight device of Fig. 2c, the purpose of this invention in either (Fig. 2d) rigid or flapping blade helicopters may also be achieved by substituting for the weight 31 an auxiliary air-foil, either ahead, as indicated at 31' with the modified linkage 37' as shown in Fig. 2c', or aft of the blade. Due to the vertical velocity imparted to the blades by the velocity of pitching of the helicopter, a change in angle of attack of the auxiliary airfoil will occur which will cause it to rotate about its axis of rotation 35 when its aerodynamic center is displaced from this axis of rotation. This rotation of the auxiliary airfoil may be used by means of suitable linkages to cause feathering of the main blade and thereby change its pitch cyclically in the desired manner and at the correct azimuth position, and so functions as a displacement of the effective aerodynamic axis of the main blade.

Also, in lieu of the mass weight device of Fig.

2c, the purpose of this invention in rigid blade helicopters may be achieved by the use of an aileron or movable blade portion either of which by its changed position effectively changes the shape (camber) and lift of the main blade. Movement of this aileron or blade portion, due to rate of pitching (or rolling) of the helicopter, is achieved by modifications of its aerodynamic balance characteristics as well known in the fixed wing airplane art. Such aileron or blade portion may be restrained, for example, by any of the means of the Fig. 3 series.

The effective parameter G defined above should preferably be in the range of from .5 to 5 or more in the case of the rigid feathering rotor such that the applied cyclical pitch control $\theta_c$ is 1 to 10 times the non-dimensional rate of helicopter pitching, and therefore $k$ is 1 to 10.

As illustrating various embodiments of the invention in which an aileron or movable portion of the blade of any size may be employed, reference is made to Fig. 4. In said figure the aileron 40 may be controlled by the pilot through swash plate 41 and linkages 44 with any restraining system such as those of the Fig. 3 series in the control system. Preferably, the aileron may be operated directly through the pilot-controlled swash-plate, but it may be operated indirectly by a servo tab 45 on the aileron 40 (Fig. 4b) with the servo tab 45 connected to said swash plate. The aileron has its aerodynamic center offset forwardly from its axis of rotation by effective modification of the aerodynamic balance so as to cause a trailing-edge-up floating angle when the main blade has an upward vertical velocity. This, combined with said restraining system, achieves the desired improvement in the helicopter stability characteristics. The blade 42 may be free to feather or be substantially non-feathering, and may be free to flap or be restrained from flapping to any degree (though in Fig. 4 and in Fig. 4b it is shown as non-flapping), but when the blade is free to flap the following two conditions will hold—

(1) If the blade is non-feathering or substantially so, then the aileron should have its effective aerodynamic center aft of its axis of rotation and/or its center of gravity forward of said axis of rotation, and (2) If the blade is feathering and the aileron is used as a servo to achieve such feathering, then the aileron should have its effective aerodynamic center forward of its axis of rotation and/or its center of gravity aft of said axis of rotation.

In (2) above, and in the case of the non-flapping blade, either the main blade or the aileron or both may be pilot controlled by means of the swash plates 41 or 43 and restrained with any of the systems of Fig. 3.

In the practical application of the invention, it may be necessary in some cases to compensate for some or all of the effect of the gyroscopic action of the rotating portions of the swash plates 14, 38, 41 and/or 43 and of the control systems by any of several means, for example, as by the provision of an equivalent mass rotating in the opposite direction to the direction of rotation of the rotating portion of said swash plate and effectively linked to the fixed portion of said swash plate. Such opposite rotation may be readily achieved from the rotation of the main shaft by means of a reversing gear or the equivalent.

It is to be understood that other modifications, arrangements of parts, and constructions of details may be made from those described without departing from the scope of the invention. For example, though the invention has been shown and described as embodied in helicopters with a single sustaining power-driven airscrew, the principles thereof are also applicable to multi-airscrew helicopters. Also, references to any methods or apparatus for torque correction, application of power to the main rotor hub or hubs, and certain other essential requisites of helicopters or other rotary wing aircraft as well known in the art, have been omitted as having no bearing on the operattion of the devices of the invention herein described.

The language of certain of the appended claims referring to a "blade * * * arranged and constructed to feather about a feathering axis" having at least one (or either) of its "effective" centers of gravity and aerodynamic lift displaced from said feathering axis or from each other (where other context permits) is intended to include structures in which the "blade * * * arranged and constructed to feather about a feathering axis" is either a main blade itself or a movable auxiliary control surface or blade (whether or not said auxiliary control surface or blade is additionally controlled for maneuvering purposes, e. g. by a pilot) mounted for feathering movement about an axis generally parallel to a main blade (whether such main blade be free to feather or be substantially non-feathering) wherein corrective cyclic feathering due to the Coriolis force generated by the "blade" motion is directly applied to a "blade" itself and, in addition, to functionally equivalent structures (as in Figs. 2c, 2d, 4 and 4b) wherein said force is applied indirectly as through linkage (e. g., through a swash plate) back to either the auxiliary control blade, or main blade, or a control for either.

I claim:

1. In a rotary wing aircraft having a body, means for improving the control characteristics of the aircraft comprising a rotor having at least one radially extending blade operatively connected with said body for rotation above said body about a generally upright axis, said blade being arranged and constructed to feather about a feathering axis, and having at least one of its effective centers of gravity and aerodynamic lift displaced from said feathering axis, cyclic pitch control means including a non-rotating linkage operatively connected through rotating members to said blade, and a yieldable restraining means operatively connected with said linkage to restrain the degree of feathering of said blade provided by such displacement wherein the degree of improvement of control characteristics provided by said means is $$0.5 < \frac{\text{corrective cyclical pitch control}}{2 \times \text{rate of disturbance}} < 20.0$$

2. In a rotary wing aircraft having a body, means for improving the control characteristics of the aircraft comprising a rotor having at least one radially extending blade operatively connected with said body for rotation above said body about a generally upright axis, said blade being arranged and constructed to feather about a feathering axis, and having at least one of its effective centers of gravity and aerodynamic lift displaced from said feathering axis, cyclic pitch control means including a non-rotating linkage operatively connected through rotating members to said blade, and a yieldable restraining means including elastic means and viscous means operatively connected with said linkage to restrain the degree of feathering of said blade provided by such displacement, said viscous means being connected with a non-rotating portion of said cyclic pitch control means wherein the dergee of improvement of control characteristics provided by said means is $$0.5 < \frac{\text{corrective cyclical pitch control}}{2 \times \text{rate of disturbance}} < 20.0$$

3. In a rotary wing aircraft having a body, means for improving the control characteristics of the aircraft comprising a rotor having at least one radially extending blade operatively connected with said body for rotation above said body about a generally upright axis, said blade being arranged and constructed to feather about a feathering axis, and having its effective center of gravity displaced forwardly from said feathering axis, cyclic pitch control means including a non-rotating linkage operatively connected through rotating members to said blade, and a yieldable restraining means operatively connected with said linkage to restrain the degree of feathering of said blade provided by such displacement wherein the degree of improvement of control characteristics provided by said means is $$0.5 < \frac{\text{corrective cyclical pitch control}}{2 \times \text{rate of disturbance}} < 20.0$$

4. In a rotary wing aircraft as claimed in claim 3, wherein the effective center of gravity is displaced by moving the center of gravity of the blade itself.

5. In a rotary wing aircraft as claimed in claim 3 wherein the effecttive center of gravity is displaced by weight means mounted on and movable relative to said blade and having a weight linkage connected and arranged cyclically to feather the blade in accordance with the movement of said weight means due to the Coriolis force.

6. In a rotary wing aircraft having a body, means for improving the control characteristics of the aircraft comprising a rotor having at least one radially extending blade operatively connected with said body for rotation above said body about a generally upright axis, said blade being arranged and constructed to feather about a feathering axis, and having its effective center of aerodynamic lift displaced rearwardly from said axis, cyclic pitch control means including a non-rotating linkage operatively connected through rotating members to said blade, and a yieldable restraining means operatively connected with said linkage to restrain the degree of feathering of said blade provided by such displacement wherein the degree of improvement of control characteristics provided by said means is $$0.5 < \frac{\text{corrective cyclical pitch control}}{2 \times \text{rate of disturbance}} < 20.0$$

7. In a rotary wing aircraft as claimed in claim 6, wherein the effective center of aerodynamic lift is displaced by moving the center of aerodynamic lift of the blade itself.

8. In a rotary wing aircraft having a body, means for improving the control characteristics of the aircraft comprising a rotor having at least one radially extending blade operatively connected with said body for rotation above said body about a generally upright axis, said blade being arranged and constructed to feather about a feathering axis, and having its effective center of gravity displaced forwardly of its effective center of aerodynamic lift, cyclic pitch control means including a non-rotating linkage operatively connected through rotating members to said blade, and a yieldable restraining means operatively connected with said linkage to restrain the degree of feathering of said blade provided by such displacement wherein the degree of improvement of control characteristics provided by said means is $$0.5 < \frac{\text{corrective cyclical pitch control}}{2 \times \text{rate of disturbance}} < 20.0$$

9. In a rotary wing aircraft having a body, means for improving the control characteristics of the aircraft comprising a rotor having at least one radially extending blade operatively connected with said body for rotation above said body about a generally upright axis, said blade being arranged and constructed to feather about a feathering axis, and having its effective center of gravity displaced forwardly from said feathering axis, cyclic pitch control means including a non-rotating linkage operatively connected through rotating members to said blade, and a yieldable restraining means including elastic means and viscous means operatively connected with said linkage to restrain the degree of feathering of said blade provided by such displacement, said viscous means being connected with a non-rotating portion of said cyclic pitch control means wherein the degree of improvement of control characteristics provided by said means is $$0.5 < \frac{\text{corrective cyclical pitch control}}{2 \times \text{rate of disturbance}} < 20.0$$

10. In a rotary wing aircraft as claimed in claim 9 wherein the effective center of gravity is displaced by weight means mounted on and movable relative to said blade, said weight means having a linkage connected to a swash plate cyclically to feather the blade in accordance with the movement of said weight means due to the Coriolis force.

11. In a rotary wing aircraft having a body, means for improving the control characteristics of the aircraft comprising a rotor having at least one radially extending blade operatively connected with said body for rotation above said body about a generally upright axis, said blade being arranged and constructed to feather about a feathering axis, and having its effective center of aerodynamic lift displaced rearwardly from said axis, cyclic pitch control means including a non-rotating linkage operatively connected through rotating members to said blade, and a yieldable restraining means including elastic means and viscous means operatively connected with said linkage to restrain the degree of feathering of said blade provided by such displacement, said viscous means being connected with a non-rotating portion of said cyclic pitch control means wherein the degree of improvement of control characteristics provided by said means is $$0.5 < \frac{\text{corrective cyclical pitch control}}{2 \times \text{rate of disturbance}} < 20.0$$

12. In a rotary wing aircraft as claimed in claim 11 wherein the effective center of aerodynamic lift is displaced by an aerodynamic surface mounted on and movable relative to said blade, said surface having a linkage connected to a swash plate cyclically to feather the blade in accordance with the movement of said surface due to the Coriolis force.

13. In a rotary wing aircraft having a body, means for improving the control characteristics of the aircraft comprising a rotor having at least one radially extending blade operatively connected with said body for rotation above said body about a generally upright axis, said blade being arranged and constructed to feather about a feathering axis, and having its effective center of gravity displaced forwardly of its effective center of aerodynamic lift whereby cyclic pitch control means including a non-rotating linkage operatively connected through rotating members to said blade, and a yieldable restraining means including elastic means and viscous means operatively connected with said linkage to restrain the degree of feathering of said blade provided by such displacement, said viscous means being connected with a non-rotating portion of said cyclic pitch control means wherein the degree of improvement of control characteristics provided by said means is $$0.5 < \frac{\text{corrective cyclical pitch control}}{2 \times \text{rate of disturbance}} < 20.0$$

14. In a rotary wing supported aircraft having a body, means for improving the control characteristics of the aircraft comprising a main rotor having at least one radially extending main blade mounted on said body for rotation above said body about a generally upright axis, and an auxiliary control blade operatively connected to said main rotor and arranged and constructed to feather about a feathering axis, said auxiliary control blade having at least one of its effective centers of gravity and aerodynamic lift displaced from said feathering axis, cyclic pitch control means including a non-rotating linkage operatively connected through rotating members to said blade, and a yieldable restraining means operatively connected with said linkage to restrain the degree of feathering of said blade provided by such displacement wherein the degree of improvement of control characteristics provided by said means is $$0.5 < \frac{\text{corrective cyclical pitch control}}{2 \times \text{rate of disturbance}} < 20.0$$

15. In a rotary wing supported aircraft as claimed in claim 14 in which said auxiliary control blade is mounted on said main blade, and said control blade has a linkage connected to the main blade and arranged cyclically to feather the main blade in accordance with the movement of said control blade due to the Coriolis force.

16. In a rotary wing supported aircraft having a body, means for improving the control characteristics of the aircraft comprising a main rotor having at least one radially extending non-feathering main blade mounted on said body for rotation above said body about a generally upright axis, and an auxiliary control blade mounted on said main blade operatively connected to said main rotor and arranged and constructed to feather about a feathering axis, said auxiliary control blade having at least one of its effective center of gravity and aerodynamic lift displaced from said feathering axis, cyclic pitch control means including a non-rotating linkage operatively connected through rotating members to said blade, and a yieldable restraining means operatively connected with said linkage to restrain the degree of feathering of said blade provided by such displacement wherein the degree of improvement of control characteristics provided by said means is $$0.5 < \frac{\text{corrective cyclical pitch control}}{2 \times \text{rate of disturbance}} < 20.0$$

RENÉ H. MILLER.

References Cited in the file of this patent

UNITED STATES PATENTS

| Number | Name | Date |
| --- | --- | --- |
| 1,836,406 | Smith | Dec. 15, 1931 |
| 1,917,965 | Gerhardt | July 11, 1933 |
| 1,950,411 | Larsen | Mar. 13, 1934 |
| 1,960,141 | D'Ascanio | May 22, 1934 |
| 1,990,291 | Larsen | Feb. 5, 1935 |
| 2,135,700 | De La Cierva | Nov. 8, 1938 |
| 2,161,699 | De La Cierva | June 6, 1939 |
| 2,265,366 | Hafner | Dec. 9, 1941 |
| 2,272,439 | Stanley et al. | Feb. 10, 1942 |
| 2,380,582 | Cierva | July 31, 1945 |
| 2,414,258 | Hays | Jan. 14, 1947 |
| 2,421,364 | De La Cierva | May 27, 1947 |
| 2,437,789 | Robins | Mar. 16, 1948 |
| 2,451,541 | Doman | Oct. 19, 1948 |
| 2,455,866 | Kaman | Dec. 7, 1948 |